UNITED STATES PATENT OFFICE.

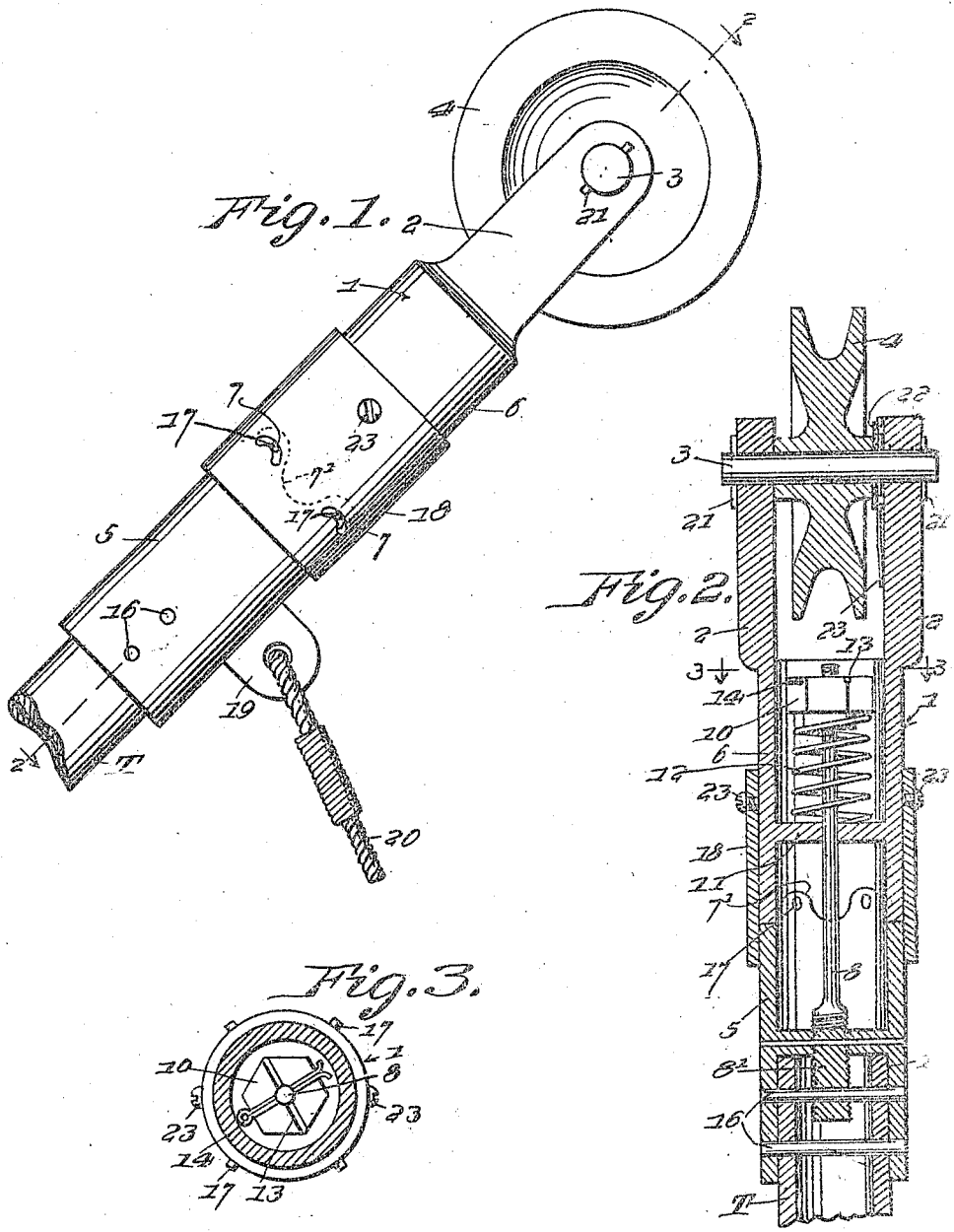

ROY C. SHOWALTER, OF ALTOONA, PENNSYLVANIA, ASSIGNOR OF ONE-HALF TO FRED K. THIEME AND ONE-FOURTH TO JOHN P. REILLY, BOTH OF ALTOONA, PENNSYLVANIA.

TROLLEY-WHEEL MOUNT.

1,092,803.  Specification of Letters Patent.  Patented Apr. 7, 1914.

Application filed June 28, 1913. Serial No. 776,222.

*To all whom it may concern:*

Be it known that I, ROY C. SHOWALTER, a citizen of the United States, residing at Altoona, in the county of Blair and State of Pennsylvania, have invented new and useful Improvements in Trolley-Wheel Mounts, of which the following is a specification.

My invention relates particularly to trolley harps which has for its object the greater efficiency and wearing qualities for this device.

It is well known that the ordinary trolley pole having a trolley wheel rigidly fastened thereto jumps off the wire very often and in many places binds severely on the wire for the reason that it is not directly over the center of the track. The binding causes considerable wear on the trolley wheel, both in the groove which is intended to receive the wire, and in the bearing. The result is that these wheels wear out very rapidly and also that the trolley jumps off the wire frequently. My invention obviates these difficulties and increases the life of the trolley wheel to more than double what it is with the ordinary trolley harp.

A further object of my invention is to so protect the parts from rain, sleet, etc., that it will be effective in any kind of weather.

With this and other objects in view my invention consists of the combination and arrangement of parts shown in the accompanying drawings, in which—

Figure 1 is a side view of a trolley harp in the position it ordinarily stands when in service. Fig. 2 is a cross section on line "2—2" Fig. 1. Fig. 3 is a cross section on line "3—3" Fig. 2, looking in the direction of the arrows.

To the end of the ordinary trolley pole "T" is fastened the trolley harp "1." This may be done in any manner but I preferably employ rivets or bolts "16," which pass through the pole and the harp. At the upper end of this harp is a fork "2—2" in which is mounted a trolley wheel "4" revolving upon an axle "3." This axle is preferably stationary. In order to take up the wear and also to eliminate the noise, a washer "22" and spring "23" may be employed. The washer "22" bears against the face of the hub of the trolley wheel and is held in place by means of lugs which pass through corresponding openings in the spring "23." The spring "23" bears toward the wheel, thereby holding it solid and reducing the wear. This trolley harp is preferably hollow with a platform as shown at "11" Fig. 2. This may be solid or merely a bar and is intended to support the one end of the spiral spring while the other end rests against a washer or nut on the end of a rod "8." This rod "8" passes through the shelf "11" and is held in the other portion of the trolley harp by means of a screw thread. It may be prevented from turning by passing a pin through the lower part of the trolley harp and the end "8'" of the rod "8."

The two parts of the harp are separated by cam surfaces which fit into each other, such as shown at "7," Figs. 1 and 2. Over the upper part of the trolley harp "1" is a sleeve which extends down over the joint in the two parts of the harp where the cam surfaces are located. It is rigidly fastened to the upper part of the trolley harp so that it cannot move out of place. The means of fastening, as shown in the drawings, consist of set screws "23," but it may be rigidly fastened in any other manner such as soldering or brazing, etc. It has one or more groove slots with pins extending through it or them and secured in the lower part of the trolley harp. This is to permit the upward movement of the one part with respect to the other by reason of the cam surfaces and insuring its return to normal position, because the stop prevents movement to any degree greater than intended. The sleeve is slightly larger than the lower portion of the trolley harp and, therefore, slides freely upon it. The spring "12" is held in place by a washer and a nut "10." The upper face of the nut has two or more grooves "13" in it, and a cotter pin is passed through the bolt "8" so that it will rest in the grooves "13" of the nut "10" and thereby prevent rotation.

By reference to Fig. 2 it will be seen that the tension of the spring "12" can readily be changed by turning the nut "10" up or down on the rod "8." It is held in position by the cotter pin "14," which lodges in a groove "13" on the upper part of the nut. If the spring should happen to break it is readily removed by pulling out the cotter pin through the fork of the trolley harp and taking off the nut "10." By this means a new spring can be substituted on the road by the conductor or motorman without special tools and with very little loss of time.

From this description it will be obvious that when a lateral strain is put upon the wheel by reason of the wire being twisted with respect to the car the cam surfaces ride upward upon each other under the stress of the spring which tends to return them to normal position. As soon as the strain is taken off the wheel they do return to normal position. The upward movement of the cam surfaces is limited by the pin "17" striking the end of the slot "7." The sleeve "18" is a great protection against snow and sleet in winter time, and always insures freedom of movement between the two parts when kept in proper oil.

I, therefore, claim—

1. In a trolley harp the combination of two parts having cam surfaces, an adjustable spring for holding the two parts together, a stopping device for limiting the movement of the one relative to the other and means for protecting the joint between the two parts.

2. In a trolley harp the combination of a stationary part attached to the pole, a movable part, a cam surface between two parts, means for automatically retaining them in normal position means for limiting rotation of the movable part and means for protecting the movable parts.

3. In a trolley harp the combination of a stationary portion, a cam surface on said portion, a movable portion, a corresponding cam surface on said movable portion, a pin and spring connecting the two portions, means for adjusting the pressure of said spring and means for protecting the joint of the two portions.

4. In a trolley harp the combination of a stationary part, a movable part, a bolt fastened to the stationary part and passing through the movable part, a spring between the nut of said bolt and the movable part and means for holding the spring in any adjusted position, cam surfaces between the movable and stationary parts, and means for positively limiting the rotation of the movable part.

ROY C. SHOWALTER.

Witnesses:
 LULU CUNNINGHAM,
 LUCY HILEMAN.